United States Patent
Li

(10) Patent No.: US 10,121,093 B2
(45) Date of Patent: Nov. 6, 2018

(54) SYSTEM AND METHOD FOR BACKGROUND SUBTRACTION IN VIDEO CONTENT

(71) Applicant: SONY CORPORATION, Tokyo (JP)

(72) Inventor: Pingshan Li, Sunnyvale, CA (US)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 15/485,010

(22) Filed: Apr. 11, 2017

(65) Prior Publication Data
US 2018/0293457 A1    Oct. 11, 2018

(51) Int. Cl.
| | |
|---|---|
| *G06K 9/46* | (2006.01) |
| *G06T 7/194* | (2017.01) |
| *G06T 7/215* | (2017.01) |
| *G06K 9/34* | (2006.01) |
| *G06K 9/00* | (2006.01) |
| *G06K 9/62* | (2006.01) |

(52) U.S. Cl.
CPC ....... *G06K 9/4671* (2013.01); *G06K 9/00771* (2013.01); *G06K 9/342* (2013.01); *G06K 9/6212* (2013.01); *G06T 7/194* (2017.01); *G06T 7/215* (2017.01)

(58) Field of Classification Search
CPC .. G06K 9/00771; G06K 9/342; G06K 9/4671; G06K 9/6212; G06T 7/194; G06T 7/215
See application file for complete search history.

(56) References Cited

U.S. PATENT DOCUMENTS

| | | | | |
|---|---|---|---|---|
| 5,900,953 | A | * | 5/1999 | Bottou ..................... G06K 9/38 358/464 |
| 7,970,229 | B2 | | 6/2011 | Connell |
| 9,953,448 | B2 | * | 4/2018 | Eslami ..................... G06T 11/60 |
| 9,996,761 | B2 | * | 6/2018 | Chen ......................... G06K 9/46 |
| 2007/0047834 | A1 | | 3/2007 | Connell |
| 2008/0304708 | A1 | * | 12/2008 | Le Meur .............. G06K 9/4623 382/107 |

(Continued)

OTHER PUBLICATIONS

Chen et al. "Saliency-context two-stream convnets for action recognition." Image Processing (ICIP), 2016 IEEE International Conference on. IEEE, 2016.*

(Continued)

*Primary Examiner* — Katrina Fujita
(74) *Attorney, Agent, or Firm* — Chip Law Group

(57) ABSTRACT

Various aspects of a system and a method for background subtraction in video content are disclosed herein. The system includes an electronic device, which generates an optical flow image of an image frame from a sequence of image frames. A first distribution is determined based on pixel values of a plurality of pixels of the generated optical flow image. A second distribution is determined based on pixel values of a set of pixels of the plurality of pixels of the generated optical flow image. The set of pixels correspond to pixels that touch one or more borders of the image frame. A third distribution is further determined based on the determined first distribution and the determined second distribution. One or more peak values corresponding to one or more background regions in the generated optical flow image, are determined within a specified threshold range in the determined third distribution.

20 Claims, 4 Drawing Sheets

(56) References Cited

U.S. PATENT DOCUMENTS

| | | | |
|---|---|---|---|
| 2014/0369552 A1* | 12/2014 | Sheu | G06K 9/00771 |
| | | | 382/103 |
| 2015/0339828 A1* | 11/2015 | Djelouah | G06T 7/0087 |
| | | | 382/173 |
| 2016/0092727 A1 | 3/2016 | Ren et al. | |
| 2017/0053181 A1* | 2/2017 | Tunali | G06K 9/3233 |
| 2017/0098310 A1* | 4/2017 | Chefd'hotel | G06T 7/12 |
| 2017/0289434 A1* | 10/2017 | Eslami | H04N 5/23212 |

OTHER PUBLICATIONS

Cheng et al. "Global contrast based salient region detection." IEEE Transactions on Pattern Analysis and Machine Intelligence 37.3 (2015): 569-582.*

Rahtu et al. "Segmenting salient objects from images and videos." European Conference on Computer Vision. Springer, Berlin, Heidelberg, 2010.*

Sobral et al. "Double-constrained RPCA based on saliency maps for foreground detection in automated maritime surveillance." Advanced Video and Signal Based Surveillance (AVSS), 2015 12th IEEE International Conference on. IEEE, 2015.*

Wang et al. "Consistent video saliency using local gradient flow optimization and global refinement." IEEE Transactions on Image Processing 24.11 (2015): 4185-4196.*

Wang et al. "Deep networks for saliency detection via local estimation and global search." Computer Vision and Pattern Recognition (CVPR), 2015 IEEE Conference on. IEEE, 2015.*

Wu et al. "Spatiotemporal saliency detection using border connectivity." Eighth International Conference on Digital Image Processing (ICDIP 2016). vol. 10033. International Society for Optics and Photonics, 2016.*

Zhai et al. "Visual attention detection in video sequences using spatiotemporal cues." Proceedings of the 14th ACM international conference on Multimedia. ACM, 2006.*

Zhang et al. "Saliency detection: a boolean map approach." Computer Vision (ICCV), 2013 IEEE International Conference on. IEEE, 2013.*

Zhang et al. "Exploiting surroundedness for saliency detection: a boolean map approach." IEEE transactions on pattern analysis and machine intelligence 38.5 (2016): 889-902.*

Zhu et al. "Saliency optimization from robust background detection." Proceedings of the IEEE conference on computer vision and pattern recognition. 2014.*

Zhu et al. "Adaptive pooling over multiple trajectory attributes for action recognition." Advanced Video and Signal Based Surveillance (AVSS), 2015 12th IEEE International Conference on. IEEE, 2015.*

Destalem, et al, "Dynamic Background Updating for Lightweight Moving Object Detection", World Academy of Science, Engineering and Technology International Journal of Computer, Electrical, Automation, Control and Information Engineering, vol. 9, No. 8, pp. 1888-1891.

Chen, et al., "Spatiotemporal Background Subtraction Using Minimum Spanning Tree and Optical Flow", European Conference on Computer Vision ECCV 2014: Computer Vision—ECCV 2014, pp. 521-534.

Fernández-Caballero, et al., "Optical flow or image subtraction in human detection from infrared camera on mobile robot", Robotics and Autonomous Systems, vol. 58, Issue 12,Dec. 31, 2010, pp. 1273-1281.

Tumula, et al, "Object Identification Based on Background Subtraction and Morphological Process", International Journal of Advanced Research in Computer and Communication Engineering, vol. 3, Issue 8, Aug. 2014, pp. 7781-7783.

* cited by examiner

SYSTEM AND METHOD FOR BACKGROUND SUBTRACTION IN VIDEO CONTENT

CROSS-REFERENCE TO RELATED APPLICATIONS/INCORPORATION BY REFERENCE

None.

FIELD

Various embodiments of the disclosure relate to video processing. More specifically, various embodiments of the disclosure relate to system and method for background subtraction in video content by use of optical flow distribution.

BACKGROUND

Recent advancements in the field of computer vision have led to development of various techniques for background subtraction (or foreground detection) in video content. Such techniques for background subtraction (or foreground detection) in the video content may facilitate the detection of the salient object(s), primarily required in various applications, such as video-surveillance applications.

Typically, for such salient object detection, the background subtraction may be performed based on Boolean map based saliency (BMS) algorithm. The BMS algorithm may compute saliency maps based on optical flow image of an image frame from the plurality of image frames of the video content. The BMS algorithm-based techniques assumes that regions in the image frame, touching one or more borders of the optical flow image obtained from the image frame of the video content, are associated with the background region of the image frame. Thus, the BMS algorithm-based techniques may lead to removal of such objects during background subtraction. However, in certain scenarios, it may happen that the regions, touching the one or more borders in the optical flow image, are associated with the foreground region(s) that may be potentially salient object(s). Thus, an advanced method of background subtraction may be required to avoid the removal of such objects that may touch one or more borders of the optical flow image.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method are provided for background subtraction in video content substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

The following described implementations may be found in the disclosed system and method for background subtraction in video content. Exemplary aspects of the disclosure may include a method implemented in an electronic device. The electronic device may include one or more circuits that may be configured to capture a sequence of image frames of the video content. The method may include generation of an optical flow image of an image frame from the sequence of image frames of the video content. Furthermore, the method may include determination of a first distribution based on pixel values of a plurality of pixels of the generated optical flow image. The method may further include determination of a second distribution based on a set of pixels of the plurality of pixels of the generated optical flow image. The set of pixels may correspond to pixels that touch one or more borders of the image frame. The method may further include determination of a third distribution based on the determined first distribution and the determined second distribution. Furthermore, the method may include determination of one or more peak values within a specified threshold range in the determined third distribution. The determined one or more peak values may correspond to one or more background regions in the generated optical flow image.

In accordance with an embodiment, the set of pixels may correspond to a plurality of pixels in the background in the generated optical flow image. In accordance with an embodiment, the generated optical flow image may further include at least a background region that may comprise pixels that touches the one or more borders of the image frame. In accordance with an embodiment, the one or more circuits may be further configured to subtract the one or more background regions from the generated optical flow image for detection of at least the foreground region. In accordance with an embodiment, the one or more circuits may be further configured to reduce noise in at least the detected foreground region based on a determined threshold value.

In accordance with an embodiment, one or more parameters may be associated with a plurality of pixels in the one or more background regions in the generated optical flow image. In accordance with an embodiment, a type of each of the one or more background regions may be based on the one or more parameters. In accordance with an embodiment, the one or more parameters may correspond to intrinsic factors associated with the optical flow image and extrinsic factors associated with the electronic device.

Figure 1:
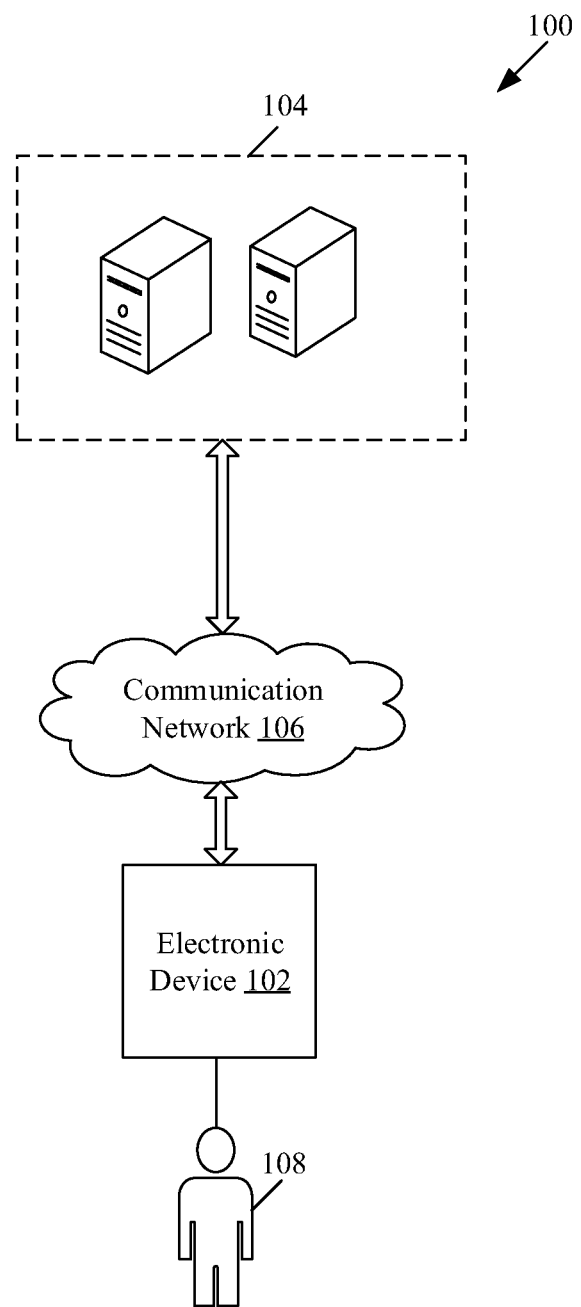
FIG. 1 is a block diagram that illustrates a network environment for background subtraction in video content, in accordance with an embodiment of the disclosure.

FIG. 1 is a block diagram that illustrates a network environment for background subtraction in video content, in accordance with an embodiment of the disclosure. With reference to FIG. 1, there is shown an exemplary network environment 100. The network environment 100 may also be referred to as a network system. The network environment 100 may include an electronic device 102, a server 104, a communication network 106, and one or more users, such as a user 108. With reference to FIG. 1, the electronic device 102 may be communicatively coupled to the server 104, via the communication network 106. The user 108 may be associated with the electronic device 102.

The electronic device 102 may comprise suitable logic, circuitry, interfaces, and/or code that may be configured to communicate with the server 104. The electronic device 102 may further include one or more circuitries that may be configured to perform background subtraction in the video content. Examples of the electronic device 102 may include, but are not limited to, an imaging device, such as a camera, a camcorder, an image- or video-processing device, a motion-capture system, and/or a projector.

The server 104 may comprise a plurality of logic circuits, interfaces, and/or code that may be configured to communicate with the electronic device 102. The server 104 may further include one or more circuitries that may be configured to perform background subtraction in the video content. Examples of the server 104 may include, but are not limited to a web server, a database server, a file server, an application server, or a combination thereof. The server 104 may be implemented by use of several technologies that are well known to those skilled in the art.

The communication network 106 may include a medium through which the electronic device 102 and the server 104, may communicate with each other. The communication network 106 may be a wired or wireless communication network. Examples of the communication network 106 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

In operation, the electronic device 102 may be configured to capture a video content. The captured video content may include a sequence of image frames. The sequence of image frames may include a plurality of image frames captured at subsequent time stamps. For example, a first image frame of the plurality of image frames may be captured at a first time stamp "t1" and a second image frame of the plurality of image frames may be captured at next time stamp "t2". Thus, the first image frame followed by the second image frame may correspond to the sequence of image frames, in accordance with the example. In accordance with an embodiment, the electronic device 102 may be configured to receive the video content from an external database, via the communication network 106. In accordance with an embodiment, the electronic device 102 may be configured to receive the video content from an image capturing device (not shown), communicatively coupled with the electronic device 102, via the communication network 106. The sequence of images may include a plurality of pixels in a plurality of regions. The plurality of regions may correspond to background or foreground object(s) in the video content.

In accordance with an embodiment, the electronic device 102 may be configured to generate an optical flow image of each image frame from the sequence of image frames. The optical flow image of each image frame may be generated, based on one or more techniques, such as phase correlation and discrete optimization, which are known in the art. The optical flow image of each image frame may indicate the pixel motion in current image frame with respect to previous image frame. In accordance with an embodiment, the pixel motion may be indicated based on intensity of the pixels in the optical flow image.

In accordance with an embodiment, the electronic device 102 may be further configured to determine a first distribution, based on pixel values of the plurality of pixels of the generated optical flow image. The determined first distribution, such as a first histogram, may correspond to an optical flow distribution. The determination of the first distribution, i.e. the optical flow distribution, is explained in detail in FIG. 2.

Further, the electronic device 102 may be configured to determine a second distribution (such as a second histogram), based on pixel values of a set of pixels of the plurality of pixels of the generated optical flow image. The set of pixels may correspond to pixels that touch one or more borders of the image frame. The determined second distribution may correspond to a border pixel distribution. The determination of the second distribution, i.e. the border pixel distribution, is explained in detail, for example, in FIG. 2.

The electronic device 102 may be further configured to determine a third distribution (such as a third histogram), based on the determined first distribution and the determined second distribution. The electronic device 102 may be further configured to determine one or more peak values within a specified threshold range in the determined third distribution. The determined one or more peak values may correspond to one or more background regions in the generated optical flow image. The determination of the one or more peak values in the determined third distribution is explained in detail in FIG. 2 and FIG. 4. In accordance with an embodiment, all the three distributions, such as the first distribution, the second distribution, and the third distribution may correspond to a histogram. It is to be understood by those skilled in the art that other graphical representations to depict distribution of data, such as frequency of a variable or probability distribution of a continuous variable (pixel values in this case) may be used without departing from the scope of the disclosure.

In accordance with an embodiment, the optical flow image generated by the electronic device 102 may further include at least a background region that may comprise pixels that touch the one or more borders of the image frame from the sequence of image. In accordance with an embodiment, the electronic device 102 may be configured to subtract the one or more background regions from the generated optical flow image for detection of at least the foreground region. In accordance with an embodiment, the electronic device 102 may be further configured to reduce noise in at least the detected foreground region based on a determined threshold value.

In accordance with an embodiment, one or more parameters may be associated with a plurality of pixels in the one or more background regions in the optical flow image generated by the electronic device 102. In accordance with an embodiment, a type of the one or more background regions may be based on the one or more parameters. In accordance with an embodiment, the one or more parameters may correspond to intrinsic factors associated with the optical flow image generated by the electronic device 102 and extrinsic factors associated with the electronic device 102.

In accordance with another aspect of the disclosure, the electronic device 102 may be configured to transmit the captured sequence of image frames of the video content to the server 104, via the communication network 106. The server 104 may be configured to process the sequence of image frames, received from the electronic device 102, for generation of the optical flow image of the image frame from the sequence of image frames of the video content. The server 104 may be further configured to determine the first distribution based on pixel vales of a plurality of pixels of the generated optical flow image. The server 104 may be further configured to determine the second distribution based on pixel values of a set of pixels of the plurality of pixels of the generated optical flow image. The set of pixels may correspond to pixels that touch one or more borders of the image frame. Based on the determined first distribution and the determined second distribution, the server 104 may be configured to determine a third distribution. The server 104 may be further configured to determine one or more peak values within a specified threshold range in the determined third distribution. The determined one or more peak values may correspond to one or more background regions in the generated optical flow image. The server 104 may be further configured to subtract the one or more background regions from the generated optical flow image for detection of at least the foreground region. The server 104 may be further configured to transmit at least the detected foreground region to the electronic device 102, via the communication network 106.

Various embodiments of the disclosure enables to overcome the problem of removal of objects that touch one or more borders of an image frame. For instance, a BMS algorithm may be used for background subtraction. In such a case, the disclosed system and method enables accurate and fail-safe detection of the foreground objects of an image frame from the sequence of image frames, such as video content irrespective of position of objects that may touch one or more borders of one or more image frames in the sequence of image frames.

Figure 2:
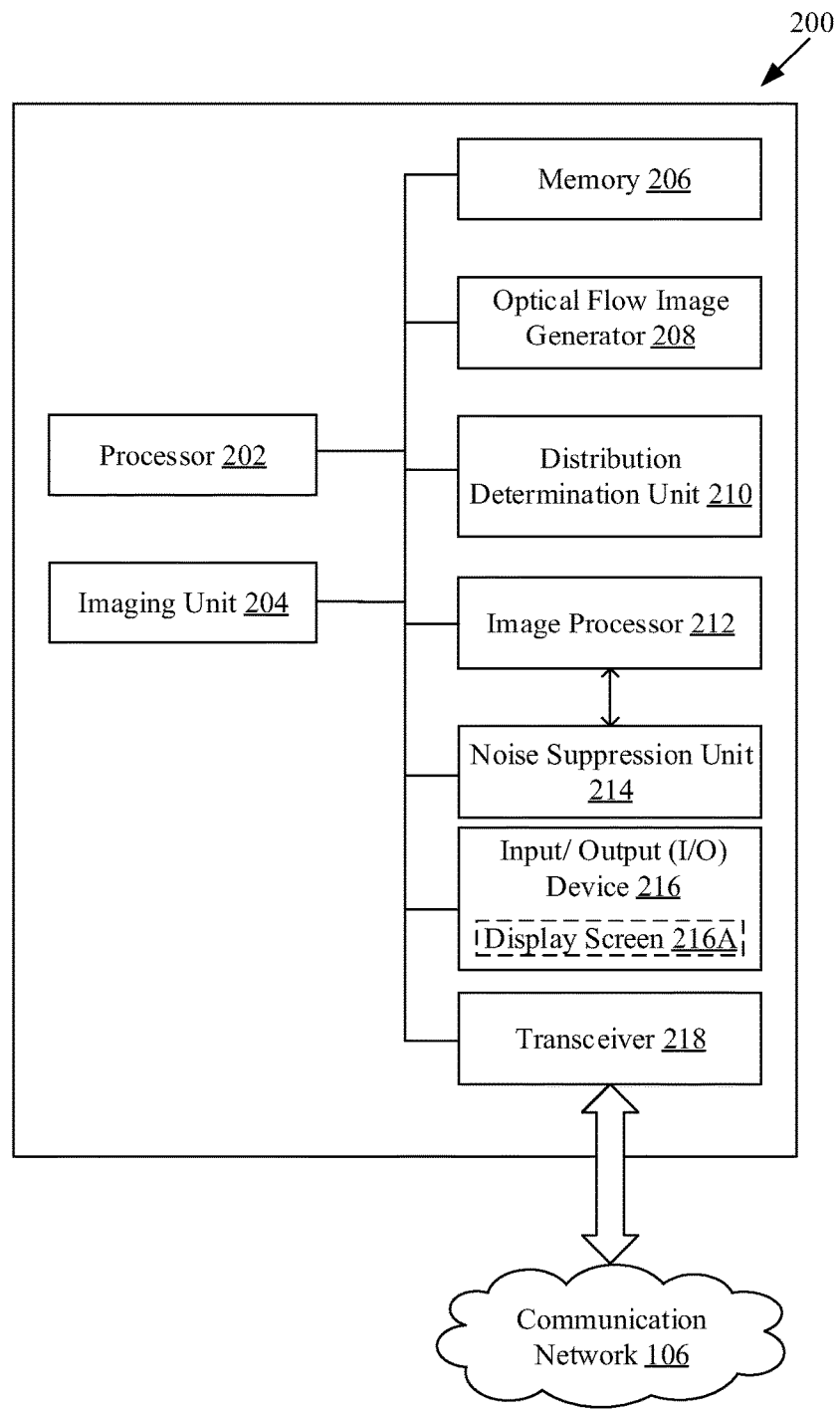
FIG. 2 is a block diagram that illustrates an exemplary system for background subtraction in video content, in accordance with an embodiment of the disclosure.

FIG. 2 is a block diagram that illustrates an exemplary system for background subtraction in video content, in accordance with an embodiment of the disclosure. FIG. 2 is explained in conjunction with the elements of FIG. 1. With reference to FIG. 2, there is shown a block diagram 200 that may include one or more circuits configured to perform background subtraction in the video content. The one or more circuits may include a processor 202, an imaging unit 204, a memory 206, an optical flow image generator unit 208, a distribution determination unit 210, an image processor 212, a noise suppression unit 214, one or more input/output (I/O) devices, such as an I/O device 216, and a transceiver 218. Further, the I/O device 216 may comprise a display screen 216A. There is further shown the communication network 106 of FIG. 1.

As an exemplary embodiment, the block diagram 200 is shown to be implemented in an exemplary electronic device, such as the electronic device 102. However, in accordance with an embodiment, the block diagram 200 may be implemented in an exemplary server, such as the server 104, without deviation from the scope of the disclosure.

With reference to FIG. 2, the one or more circuits, such as the processor 202, the imaging unit 204, the memory 206, the optical flow image generator unit 208, the distribution determination unit 210, the image processor 212, the noise suppression unit 214, the I/O device 216, and the transceiver 218 may be interconnected with each other. The output of the optical flow image generator unit 208 may be provided to the distribution determination unit 210 in conjunction with the processor 202. The output of the distribution determination unit 210 may be provided to the image processor 212 in conjunction with the processor 202. The output of the image processor 212 may be provided to the noise suppression unit 214 in conjunction with the processor 202. Further, the output of the image processor 212 may be provided to the I/O device 216. The transceiver 218 may be configured to communicate with a server, such as the server 104 (FIG. 1), via the communication network 106.

The processor 202 may comprise suitable logic, circuitry, interfaces, and/or code that may be operable to execute a set of instructions stored in the memory 206. The processor 202 may be further configured to perform background subtraction in the video content that comprises the sequence of image frames, captured by the electronic device 102. The processor 202 may be implemented based on a number of electronic control unit technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The imaging unit 204 may comprise suitable logic, circuitry, interfaces, and/or code that may be configured to capture a sequence of image frames of video content. The imaging unit 204 may refer to an in-built camera or an image sensor of the electronic device 102. The imaging unit 204 may comprise a viewfinder that may be configured to compose and/or focus the view captured by the imaging unit 204. The imaging unit 204 may be configured to store the captured sequence of image frames of the video content in a local buffer and/or the memory 206.

The memory 206 may comprise suitable logic, circuitry, and/or interfaces that may be operable to store a machine code and/or a computer program with at least one code section executable by the processor 202. The memory 206 may be further operable to store the video content that comprises the sequence of image frames, captured by the electronic device 102. The memory 206 may be further operable to store operating systems and associated applications of the electronic device 102. Examples of implementation of the memory 206 may include, but are not limited to, Random Access Memory (RAM), Read Only Memory (ROM), Hard Disk Drive (HDD), Flash memory, and/or a Secure Digital (SD) card.

The optical flow image generator unit 208 may comprise suitable logic, circuitry, and/or interfaces that may be configured to receive from the memory 206, the sequence of image frames of the video content, captured by the electronic device 102. The optical flow image generator unit 208 may be further configured to generate an optical flow image of an image frame from the sequence of image frames. The optical flow image generator unit 208 may be implemented by use of several technologies that are well known to those skilled in the art.

The distribution determination unit 210 may comprise suitable logic, circuitry, and/or interfaces that may be configured to receive the output from the optical flow image generator unit 208. The distribution determination unit 210 may be further configured to determine a first distribution, a second distribution, and a third distribution of the plurality of pixels in the optical flow image. The distribution determination unit 210 may be implemented as a separate processor or circuitry in the electronic device 102. The distribution determination unit 210 and the processor 202 may be implemented as an integrated processor or a cluster of processors that perform the functions of the distribution determination unit 210 and the processor 202. The distribution determination unit 210 may be implemented as a set of instructions stored in the memory 206, which on execution by the processor 202 may perform the functions of the electronic device 102.

The image processor 212 may comprise suitable logic, circuitry, and/or interfaces that may be configured to receive the determined third distribution from the distribution determination unit 210. The image processor 212 may be further configured to determine one or more peak values within a specified threshold range in the determined third distribution. In accordance with an embodiment, the one or more peak values may correspond to one or more background regions in the optical flow image generated by the optical flow image generator unit 208. The image processor 212 may be further configured to perform subtraction of one or more background regions from the optical flow image. The subtraction of one or more background regions may be performed for detection of at least a foreground region included in the optical flow image. The image processor 212 may be implemented as a separate processor or circuitry in the electronic device 102. The image processor 212 and the processor 202 may be implemented as an integrated processor or a cluster of processors that perform the functions of the image processor 212 and the processor 202. The image processor 212 may be implemented as a set of instructions stored in the memory 206, which on execution by the processor 202 may perform the functions of the electronic device 102.

The noise suppression unit 214 may comprise suitable logic, circuitry, and/or interfaces that may be configured to reduce noise in at least the foreground region detected by the image processor 212. The noise suppression unit 214 may be implemented by use of several technologies that are well known to those skilled in the art.

The I/O device 216 may comprise suitable logic, circuitry, interfaces, and/or code that may be configured to control presentation of the detected foreground object on a display screen 216A. The display screen 216A may correspond to the display of the electronic device 102. The I/O device 216 may comprise various input and output devices that may be configured to communicate with the processor 202. Examples of the input devices or input mechanisms may include, but are not limited to, a shutter button, a record button on the electronic device 102 (such as a camera), a software button on a UI of the electronic device 102, the imaging unit 204, a touch screen, a microphone, a motion sensor, and/or a light sensor. Examples of the output devices may include, but are not limited to, the display screen 216A, a projector screen, and/or a speaker. The display screen 216A may be realized through several known technologies, such as, but not limited to, Liquid Crystal Display (LCD) display, Light Emitting Diode (LED) display, and/or Organic LED (OLED) display technology.

The transceiver 218 may comprise suitable logic, circuitry, interfaces, and/or code that may be configured to communicate with one or more servers, such as the server 104, via the communication network 106 (as shown in FIG. 1). The transceiver 218 may implement known technologies to support wired or wireless communication of the electronic device 102 with the communication network 106. Components of the transceiver 218 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the imaging unit 204 in conjunction with the processor 202 in the electronic device 102 may be configured to capture a sequence of image frames. The imaging unit 204 may be controlled based on an input signal received from a user to capture the sequence of image frames. The input signal may be provided by the user, via a selection of a graphical button rendered on the I/O device 216 or a button-press event of a hardware button available at the electronic device 102. Alternatively, the electronic device 102, may retrieve the sequence of image frames from the memory 206. In such a case, the sequence of image frames may be pre-stored in the memory 206.

In accordance with an embodiment, the processor 202, in conjunction with the transceiver 218, may be configured to receive video content from an external database, via the communication network 106. The processor 202, in conjunction with the transceiver 218, may be configured to receive the video content from an image capturing device, communicatively coupled with the electronic device 102, via the communication network 106. The video content may include a sequence of image frames. The sequence of image frames may include a plurality of pixels in a plurality of regions. The plurality of regions may correspond to background or foreground object(s) in the video content, hereinafter referred to as background regions and a foreground regions.

In accordance with an embodiment, one or more parameters may be associated with the plurality of pixels in the plurality of regions of an image frame. The one or more parameters may include intrinsic parameters and extrinsic parameters. The intrinsic parameters may be associated with the image frame from the sequence of image frames, captured by the electronic device 102. The intrinsic factors may include, but are not limited to, color intensity of the pixels of the image frame, depth information of the pixels in the image frame, and luminance values (luma component) of the pixels of the image frame. The extrinsic factors may be associated with the electronic device 102. The extrinsic factors may include, but are not limited to, change in motion of the electronic device 102 and rolling shutter. In accordance with an embodiment, a type of each of the one or more background regions may be based on the one or more parameters.

The optical flow image generator unit 208, in conjunction with the processor 202, may be configured to determine an optical flow image of each image frame from the sequence of image frames of the video content. The optical flow image may include a plurality of regions that correspond to the plurality of regions in the image frame. Pixels in each of the plurality of regions may have a corresponding intensity values. For example, a set of pixels in a region that corresponds to a region in the image frame with highest motion vector may have the highest intensity value. Another set of pixels in another region that corresponds to a region in the image frame with lowest motion vector may have the least intensity value. Other sets of pixels in other regions that correspond to regions in the image frame with intermediate motion vectors may have intermediate intensity values. Further, the optical flow image generator unit 208 may be configured to communicate the generated optical flow image to the distribution determination unit 210. In accordance with an embodiment, the generated optical flow image may include at least a foreground region that may comprise pixels that touch the one or more borders of the image frame.

The distribution determination unit 210 in conjunction with the processor 202 may be configured to determine a first distribution, based on pixel values of a plurality of pixels of the optical flow image. The first distribution may correspond to an optical flow distribution represented by a first histogram. The distribution determination unit 210 in conjunction with the processor 202 may be further configured to determine a second distribution, based on pixel values of a set of pixels of the plurality of pixels of the optical flow image. The second distribution may correspond to a border pixel distribution represented by a second histogram. In accordance with an embodiment, the set of pixels may correspond to pixels that touch one or more borders of the image frame from the sequence of image frames of the video content. In accordance with an embodiment, the set of pixels may correspond to a plurality of pixels in the background region in the optical flow image generated by the optical flow image generator unit 208.

The distribution determination unit 210 may be further configured to determine a third distribution based on the determined first distribution and the determined third distribution. The third distribution may be represented by a third histogram. In accordance with an embodiment, the third distribution may be determined based on the following mathematical expression (1):

$$C=A+B*B \quad (1)$$

where,
C corresponds to a histogram value of each pixel value in the third distribution;
A corresponds to a histogram value of each pixel value in the first distribution; and
B corresponds to a histogram value of each pixel value in the second distribution.

In accordance with an embodiment, the distribution determination unit 210 may be further configured to communicate the determined third distribution to the image processor 212. The third distribution may indicate a set of peak values that correspond to various regions in the optical flow image generated by the optical flow image generator unit 208. Based on the determined third distribution, the image processor 212 may be configured to determine one or more peak values within a specified threshold range in the determined third distribution. In accordance with an embodiment, the determined one or more peak values may correspond to one or more background regions in the optical flow image.

In certain scenarios, the background region in the optical flow image may have constant pixel values. In some cases, the pixels values in the background in the optical flow image may gradually change due to camera motion and rolling shutter.

In accordance with an embodiment, the image processor 212 may be further configured to perform background subtraction of the one or more background regions from the optical flow image, generated by the optical flow image generator unit 208. In accordance with an embodiment, the image processor 212 may be further configured to detect at least the foreground region in the image frame based on the subtraction of the one or more background regions from the optical flow image. An output of the image processor 212 may be communicated to the noise suppression unit 214.

In accordance with an embodiment, the noise suppression unit 214 may be configured to reduce noise in at least the detected foreground region based on a determined threshold value. In accordance with an embodiment, the noise may correspond to one or more background regions. In an instance, when the number of pixels in the detected connected foreground region is greater than the determined threshold value, the detected connected foreground region may not be considered as noise. In another instance, when the number of pixels in the detected connected foreground region is less than the determined threshold value, the detected connected foreground region may be considered as noise. In such an instance, the image processor 212, in conjunction with the noise suppression unit 214 and the processor 202, may be configured to remove one or more foreground regions that have a number of pixels less than the determined threshold value from the foreground region detected by the image processor 212.

In accordance with an embodiment, the display screen 216A included in the I/O device 216, in conjunction with the image processor 212 may be configured to display or present the output of the background subtraction and the detected foreground region in the display screen 216A. In accordance with an embodiment, the memory 206 in conjunction with the processor 202 may store the detected foreground region. In accordance with an embodiment, the transceiver 218 may transmit the detected foreground region to one or more servers, such as the server 104, via the communication network 106.

Figure 3:
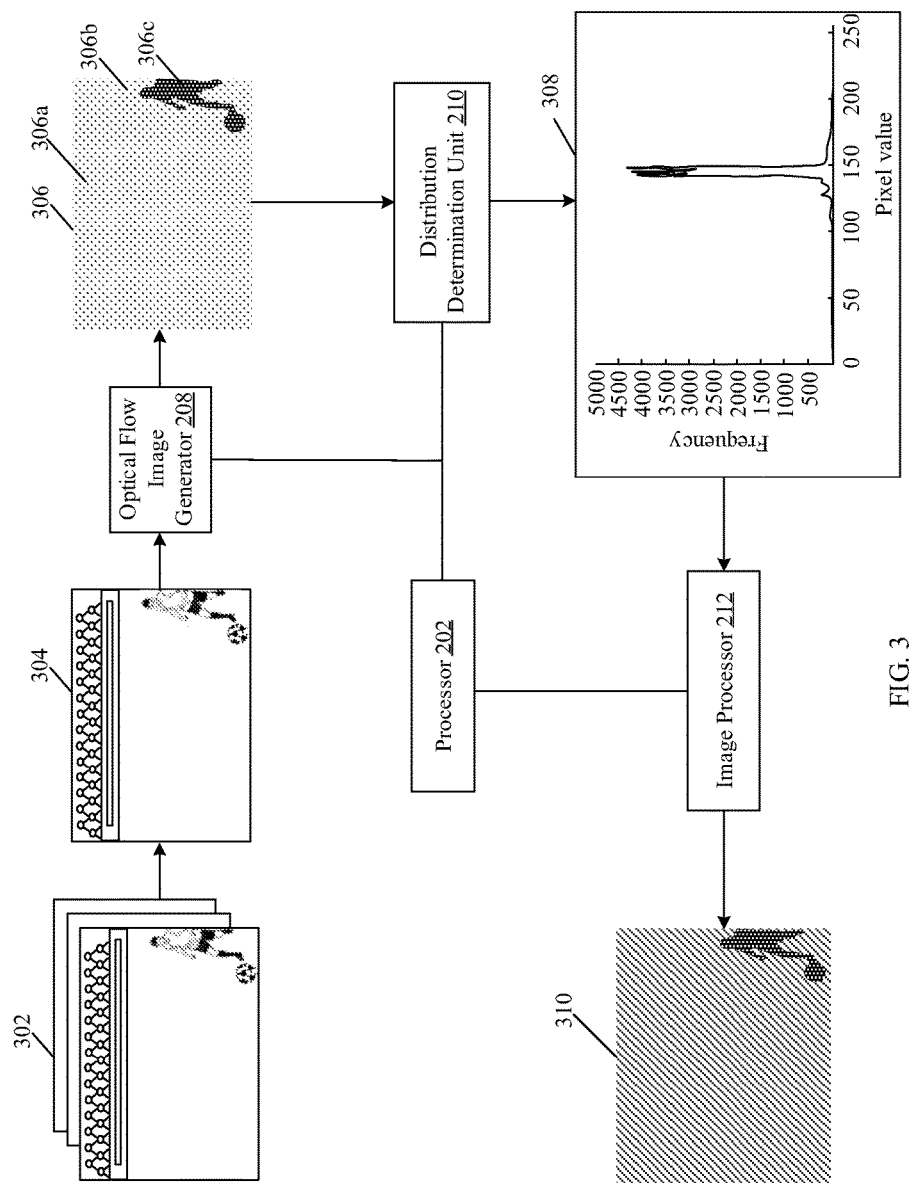
FIG. 3 illustrates an exemplary scenario for background subtraction in video content, in accordance with an embodiment of the disclosure.

FIG. 3 illustrates an exemplary scenario for background subtraction in video content, in accordance with an embodiment of the disclosure. With reference to FIG. 3, there is shown an exemplary scenario 300 of a scene of a live soccer match that includes three different regions. The three different regions may correspond to spectators, a soccer player with a soccer ball, and the soccer field. The exemplary scenario 300 is described in conjunction with FIG. 2. The scene may be captured by the electronic device 102, such as a camcorder. The camcorder may include one or more circuits, as described in FIG. 2.

The captured scene may correspond to video content. The spectators and the soccer field may correspond to one or more background regions and the soccer player with the soccer ball may correspond to the objects in the foreground region. In the exemplary scenario 300, there is shown a sequence of image frames 302, an image frame 304, an optical flow image 306, a graphical distribution 308, and a resultant image frame 310.

With reference to the exemplary scenario 300, the sequence of image frames 302 may be captured by the electronic device 102. The image frame 304 may correspond to one of the sequence of image frames 302. The optical flow image generator unit 208 in conjunction with the processor 202 may generate the optical flow image 306, as shown, based on one or more techniques, known in the art.

The optical flow image 306 includes a gradually changing background. The intensity in the background changes gradually from top to bottom. It is to be understood that gradually changing background may be readily visible in the actual optical flow image, however for representation purposes shown in dotted points in the optical flow image 306 in the FIG. 3 for patent purposes). The optical flow image 306 may comprise a plurality of regions, such as a first region 306a that corresponds to the spectators (in high intensity background region), a second region 306b that corresponds to the soccer field (in comparatively lower intensity background then top that includes the first region 306a, and a third region 306c that corresponds to the soccer player kicking the soccer ball.

Further, the distribution determination unit 210 in conjunction with the processor 202 may determine a first distribution based on pixel values of a plurality of pixels of the optical flow image 306. The first distribution may include pixel distribution of the plurality of pixels in the first region 306a, the second region 306b, and the third region 306c. Further, the distribution determination unit 210 in conjunction with the processor 202, may determine a second distribution based on a set of pixels of the plurality of pixels of the optical flow image 306. The second distribution may include pixel distribution of the plurality of pixels in the third region 306c. Based on the first distribution and the second distribution, the third distribution may be determined by the distribution determination unit 210. The third distribution may correspond to the graphical distribution 308. Further, the image processor 212 in conjunction with the processor 202, may determine one or more peak values, within a specified threshold range, in the graphical distribution 308. In accordance with an embodiment, the one or more peak values in the graphical distribution 308 may correspond to the one or more background regions that correspond to the spectators and the soccer field, in the optical flow image 306.

In accordance with the exemplary scenario, the background region in the optical flow image may have constant pixel values. In this case, the graphical distribution 308 may have indicated a single narrow peak. In some situations, the pixels values in the background in the optical flow image may gradually change due to camera motion and rolling shutter. In this case, the graphical distribution 308 may have indicated a wider and shorter peak. A process to "flatten" the background is needed before background subtraction is performed. To do this, assuming the background has constant gradient "G" in vertical direction, and adding a value −G·R to every pixel in the optical flow image, where "R" is the row number for the pixel location, the gradient "G" can be estimated using searching method to maximize the peak value in the graphical distribution 308.

Based on the one or more peak values in the graphical distribution 308, the image processor 212 in conjunction with the processor 202 may be configured to perform background subtraction of the one or more background regions that correspond to the soccer field and the spectators. Based on the background subtraction, the foreground region that corresponds to the soccer player and the soccer ball, may be detected. The resultant image frame 310 may indicate the foreground region. The resultant image frame 310 may be displayed on the display unit of the camcorder.

Figure 4:
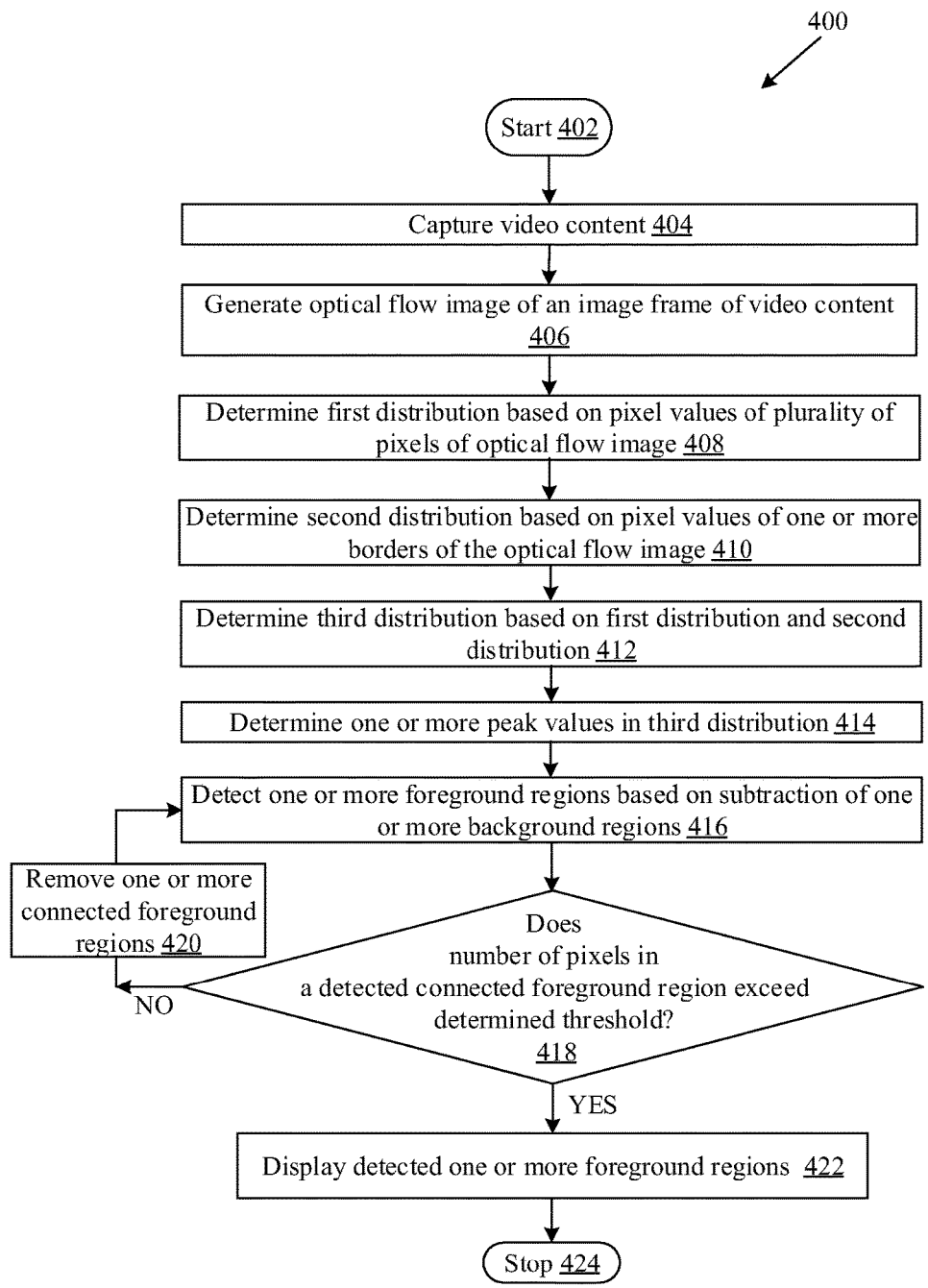
FIG. 4 depicts a flow chart that illustrates a method for background subtraction in video content, in accordance with an embodiment of the disclosure.

FIG. 4 is a flow chart that illustrates a method for background subtraction in video content, in accordance with an embodiment of the disclosure. With reference to FIG. 4, there is shown a flowchart 400. The flowchart 400 is described in conjunction with, for example, FIG. 2. The method starts at 402 and proceeds to 404.

At 404, video content that includes a sequence of image frames may be captured. In accordance with an embodiment, the imaging unit 204 in conjunction with the processor 202 in the electronic device 102 may capture the sequence of image frames of the video content. In accordance with an embodiment, the electronic device 102 may retrieve the sequence of image frames of the video content from the memory 206.

At 406, an optical flow image of an image frame of the video content may be generated. In accordance with an embodiment, the optical flow image generator unit 208 may be configured to generate the optical flow image based on the image frame from the sequence of image frames of the video content, captured by the electronic device 102.

At 408, a first distribution based on pixel values of a plurality of pixels of the optical flow image may be determined. In accordance with an embodiment, the distribution determination unit 210 may be configured to determine the first distribution based on pixel values of a plurality of pixels of the optical flow image generated by the optical flow image generator unit 208.

At 410, a second distribution based on pixel values of one or more borders of the optical flow image may be determined. In accordance with an embodiment, the distribution determination unit 210 may be configured to determine the second distribution based on pixel values of a set of pixels of the plurality of pixels of the optical flow image generated by the optical flow image generator unit 208. In accordance with an embodiment, the set of pixels may correspond to pixels that may touch one or more borders of the image frame from the sequence of image frames of the video content, captured by the electronic device 102.

At 412, a third distribution may be determined based on the first distribution and the second distribution. In accordance with an embodiment, the distribution determination unit 210 may be further configured to determine the third distribution based on the first distribution and the second distribution. Both the first distribution and the second distribution are determined by the distribution determination unit 210.

At 414, one or more peak values in the third distribution may be determined. In accordance with an embodiment, the image processor 212 may be configured to determine the one or more peak values in the third distribution determined by the distribution determination unit 210 within a specified threshold range. In accordance with an embodiment, the one or more peak values may correspond to one or more background regions in the optical flow image generated by the optical flow image generator unit 208.

At 416, a foreground region may be detected based on subtraction of one or more background regions. In accordance with an embodiment, the image processor 212 may be further configured to subtract the one or more background regions from the optical flow image generated by the optical flow image generator unit 208 for detection of at least the foreground region in the image frame.

At 418, for each detected connected foreground region, it may be determined whether number of pixels in the detected connected foreground region is greater than a determined threshold. In an instance, in an event that the number of pixels in the detected connected foreground region exceeds the determined threshold, control passes to 422. In another instance, in an event the number of pixels in the detected connected foreground region is less than the determined threshold, control passes to 420.

At 420, removal of one or more foreground regions may be performed. In accordance with an embodiment, in an event that number of pixels in the detected connected foreground region is less than the determined threshold. The detected connected foreground region may be considered as noise and the image processor 212, in conjunction with the noise suppression unit 214 and the processor 202, may be configured to remove one or more foreground regions that have a number of pixels less than the determined threshold detected by the image processor 212. Control returns to 416 for removal of such one or more foreground regions.

At 422, detected foreground region may be displayed. In accordance with an embodiment, the display screen 216A included in the I/O device 216, in conjunction with the image processor 212 may be configured to display the output of the background subtraction and the detected foreground region in the display screen 216A. Control passes to end 424.

Various embodiments of the disclosure encompass numerous advantages that includes a system and method for background subtraction in video content by use of optical flow distribution. Further, the method also helps to overcome the issue of removal of objects that touch one or more borders of an image frame in case the BMS algorithm is used for background subtraction. Further, by use of optical distribution, there is a significant improvement in the detection of the foreground objects of an image frame from the sequence of image frames, such as video content in a faster computational time. Further, in accordance with an embodiment, the present disclosed method and system is applicable for both the image frames that include constant background regions and the image frames that include gradual change background regions. Further, the disclosed method and system reduces the computational complexity and increases the overall efficiency for detection of the foreground objects, in comparison to the traditional BMS algorithm.

For example, in accordance with the exemplary scenario 300, an object (such as the soccer player (FIG. 3)), touches one of the borders of the image frame 304 (FIG. 3). In an event BMS algorithm is used for background subtraction, the soccer player being a foreground object would have been removed, as the BMS algorithm considers any object that touches one or more borders of the image frame to be background region. However, in an event the disclosed method and system is implemented, the foreground objects, such as the soccer player and the soccer ball, are detected accurately as shown in the resultant image frame 310 (FIG. 3). Hence, in comparison, the use of optical flow distribution for background subtraction is more accurate than the use of BMS algorithm for background subtraction. Thus, an improvement in the field of application of computer vision, such as video-surveillance, is provided as a result of the accurate background subtraction, thereby resulting in accurate foreground detection of the salient object(s) present in the image frames of the video content.

In accordance with an embodiment of the disclosure, a system for background subtraction in video content is disclosed. The electronic device 102 (FIG. 1) may comprise one or more circuits that may be configured to capture a sequence of image frame of the video content. The electronic device 102 may comprise one or more circuits, such as the optical flow image generator unit 208 (FIG. 2), which may be configured to generate an optical flow image of an image frame from the sequence of image frame of the video content. The one or more circuits, such as a distribution determination unit 210 (FIG. 2) may be configured to determine a first distribution based on pixel values of a plurality of pixels of the optical flow image generated by the optical flow image generator unit 208. The distribution determination unit 210 may be further configured to determine a second distribution based on pixel values of a set of pixels of the plurality of pixels of the optical flow image generated by the optical flow image generator unit 208. The set of pixels may correspond to pixels that touch one or more borders of the image frame from the sequence of image frame of the video content, captured by the electronic device 102. The distribution determination unit 210 may be further configured to determine a third distribution based on the first distribution and the second distribution, both determined by the distribution determination unit 210. The one or more circuits, such as the image processor 212, may be configured to determine one or more peak values within a specified threshold range in the third distribution determined by the distribution determination unit 210. The one or more peak values determined by the image processor 212 may correspond to one or more background regions in the optical flow image generated by the optical flow image generator unit 208 included in the electronic device 102.

Various embodiments of the disclosure may provide a non-transitory computer readable medium and/or storage medium, wherein there is stored thereon, a set of instructions executable by a machine and/or a computer to detect objects in motion. The at least one code section in the electronic device 102 may cause the machine and/or computer to perform the steps that comprise generation of an optical flow image of an image frame from a sequence of image frame of video content. The electronic device 102 may be configured to determine a first distribution based on pixel values of a plurality of pixels of the optical flow image generated by an optical flow image generator unit, such as the optical flow image generator unit 208. The electronic device 102 may be configured to compute a second distribution based on pixel values of a set of pixels of the plurality of pixels of the generated optical flow image. The set of pixels may correspond to pixels that touch one or more borders of the image frame. The electronic device 102 may be further configured to determine a third distribution based on the determined first distribution and the determined second distribution. The electronic device 102 may be further configured to determine one or more peak values within a specified threshold range in the determined third distribution. The determined one or more peak value may correspond to one or more background regions in the generated optical flow image. Such set of instructions executed by the machine and/or the computer improves the functioning of the machine and/or the computer itself.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A system for background subtraction in video content, said system comprising:
   one or more circuits in an electronic device configured to:
   generate an optical flow image of an image frame from a sequence of image frames of said video content;
   determine a first distribution based on pixel values of a plurality of pixels of said generated optical flow image;
   determine a second distribution based on pixel values of a set of pixels of said plurality of pixels of said generated optical flow image, wherein said set of pixels corresponds to pixels that touch one or more borders of said image frame;
   determine a third distribution based on said determined first distribution and said determined second distribution; and
   determine one or more peak values within a specified threshold range in said determined third distribution, wherein said determined one or more peak values correspond to one or more background regions in said generated optical flow image.

2. The system according to claim 1, wherein said one or more circuits are configured to capture said sequence of image frames of said video content.

3. The system according to claim 1, wherein said set of pixels corresponds to a plurality of pixels in said one or more background regions in said generated optical flow image.

4. The system according to claim 1, wherein said generated optical flow image further includes at least a background region comprising pixels that touches said one or more borders of said image frame.

5. The system according to claim 4, wherein said one or more circuits are further configured to subtract said one or more background regions from said generated optical flow image for detection of at least said foreground region.

6. The system according to claim 5, wherein said one or more circuits are further configured to reduce noise in at least said detected foreground region based on a determined threshold value.

7. The system according to claim 5, wherein said one or more circuits are further configured to configured to flatten a background in said optical flow image before said subtraction of said one or more background regions when pixels values in said background in said optical flow image exhibit a gradual change, wherein said flattening is done by using an estimated gradient value of said background.

8. The system according to claim 1, wherein one or more parameters are associated with a plurality of pixels in said one or more background regions in said generated optical flow image.

9. The system according to claim 8, wherein a type of each of said one or more background regions is based on said one or more parameters.

10. The system according to claim 8, wherein said one or more parameters correspond to intrinsic factors associated with said generated optical flow image and extrinsic factors associated with said electronic device.

11. A method for background subtraction in video content, said method comprising:
   in one or more circuits:
   generating an optical flow image of an image frame from a sequence of image frames of said video content;
   determining a first distribution based on pixel values of a plurality of pixels of said generated optical flow image;
   determining a second distribution based on pixel values of a set of pixels of said plurality of pixels of said generated optical flow image, wherein said set of pixels corresponds to pixels that touch one or more borders of said image frame;
   determining a third distribution based on said determined first distribution and said determined second distribution; and
   determining one or more peak values within a specified threshold range in said determined third distribution, wherein said determined one or more peak values correspond to one or more background regions in said generated optical flow image.

12. The method according to claim 11, further comprising capturing said sequence of image frames of said video content.

13. The method according to claim 11, wherein said set of pixels corresponds to a plurality of pixels in said background in said generated optical flow image.

14. The method according to claim 11, wherein said generated optical flow image further includes at least a background region comprising pixels that touches said one or more borders of said image frame.

15. The method according to claim 14, further comprising subtracting said one or more background regions from said generated optical flow image for detecting at least said foreground region.

16. The method according to claim 15, further comprising reducing noise in at least said detected foreground region based on a determined threshold value.

17. The method according to claim 11, wherein one or more parameters are associated with a plurality of pixels in said one or more background regions in said generated optical flow image.

18. The method according to claim 17, wherein a type of each of said one or more background regions is based on said one or more parameters.

19. The method according to claim 17, wherein said one or more parameters correspond to intrinsic factors associated with said generated optical flow image and extrinsic factors associated with said electronic device.

20. A non-transitory computer-readable storage medium having stored thereon, a set of computer executable instructions, for causing a system to perform steps comprising:
   generating an optical flow image of an image frame from a sequence of image frames of said video content;
   determining a first distribution based on pixel values of a plurality of pixels of said generated optical flow image;
   determining a second distribution based on pixel values of a set of pixels of said plurality of pixels of said generated optical flow image, wherein said set of pixels corresponds to pixels that touch one or more borders of said image frame;
   determining a third distribution based on said determined first distribution and said determined second distribution; and
   determining one or more peak values within a specified threshold range in said determined third distribution, wherein said determined one or more peak values correspond to one or more background regions in said generated optical flow image.

* * * * *